United States Patent [19]

Gebhardt

[11] 4,331,128
[45] May 25, 1982

[54] CLIMATE-CONTROLLED BUILDING

[76] Inventor: Karl Gebhardt, Blütenstrasse 16 A, 8500 Nurenberg 30, Fed. Rep. of Germany

[21] Appl. No.: 186,036

[22] Filed: Sep. 11, 1980

[30] Foreign Application Priority Data

Sep. 29, 1979 [DE] Fed. Rep. of Germany ....... 2939673
Feb. 19, 1980 [DE] Fed. Rep. of Germany ....... 3006083

[51] Int. Cl.³ .......................... F24J 3/02; F28D 15/00
[52] U.S. Cl. ..................................... 126/417; 126/433; 126/450; 165/104.26
[58] Field of Search ........................... 47/17; 165/105; 62/259.4, 271; 126/417, 42 9, 433, 434, 450

[56] References Cited

U.S. PATENT DOCUMENTS

| | | | |
|---|---|---|---|
| 3,290,230 | 12/1966 | Kobayashi | 126/450 |
| 3,875,926 | 4/1975 | Frank | 126/433 |
| 4,006,856 | 2/1977 | Nilsson | 126/429 |
| 4,029,081 | 6/1977 | Strong | 126/429 |
| 4,051,999 | 10/1977 | Granger | 126/431 |
| 4,084,573 | 4/1978 | Shubert | 126/429 |
| 4,119,085 | 10/1978 | Knowles et al. | 126/433 |
| 4,153,041 | 5/1979 | Grauleau et al. | 126/434 |
| 4,197,993 | 4/1980 | Trombe | 126/429 |

Primary Examiner—Daniel J. O'Connor
Attorney, Agent, or Firm—Jordan and Hamburg

[57] ABSTRACT

The present invention is directed to a method for running a climate-controlled building or rain greenhouse, and to such a climate-controlled building or rain-greenhouse with a gable shaped cross section, where an updraft of humid air is produced between two southwardly-directed oblique panels arranged at a distance from each other. The updraft is caused by the influence of insolation and delivery of water, and humidity is condensed out of the air-stream as it descends downwardly between two oblique rear panels arranged consecutively and at a distance from each other. The products of condensation are conducted to a device for supply to the inner space of the climate-controlled house, particularly in the form of rain in the case of a greenhouse.

17 Claims, 7 Drawing Figures

CLIMATE-CONTROLLED BUILDING

The present invention is directed to an energy-saving, climate-controlled, building or rain-greenhouse and to a method for the operation of said climate-controlled, building or rain-greenhouse.

Initially, this invention relates to a method of operating an energy saving, climate-controlled house (air-conditioned building) or rain-greenhouse with a gable-shaped cross section.

In temperate zones, greenhouses are used, at considerable expense of energy, to produce fresh vegetables which are needed in cooler times of the year when sunshine is lacking. The influences of light, heat and humidity are combined in such a greenhouse in the most optimal relationship with respect to the life requirements of the plants therein. The same needs for plant cultivation exist in warm and hot zones for the cultivation of plants for human consumption, important for the sustenance of life. In these climates, excess light and heat are present, but water is lacking. Wastewater, brackish water and saltwater, which might be present, cannot be of any use under the conventional conditions for the running of greenhouses. Furthermore, it is also important that in such warm and hot zones, the air must be conditioned in such a greenhouse to regulate the overpowering presentation of heat, besides furnishing needed fresh water. This is a requirement which is not only valid for greenhouses but, generally also for human dwellings. Human dwellings have the same need for production of freshwater out of usually present wastewaters, brackish water and saltwater as the aforementioned greenhouses.

Therefore, there is a considerable need to solve these problems in order to provide an air-conditioned building or rain-greenhouse with maximum advantages, using a minimum of energy and construction expense, i.e., to particularly provide by aid of the means at hand, an internal climate for a dwelling or a greenhouse, which fulfills optimum conditions for living therein or growing plants, respectively.

In one case, the critical condition is the amount of energy, and in the other case it is the presence of water.

According to the invention, this task is brought to a sensible and effective resolution by producing in an air-conditioned climate controlled building or a rain-greenhouse of the above-described kind, an updraft of humid air between two southwardly directed oblique panels which are arranged at a distance from each other, said updraft being influenced by sunshine and delivery of water. The thusly intercepted humidity will be condensed when sinking between two attached oblique rear panels arranged at a distance from each other, and the condensate will then be conveyed to a device, e.g., for raining (spraying) the internal space of said greenhouse.

Such a process uses humidity as a source of water so that not only freshwater (as available in developed communities) may be used, but also wastewater, brackish water and finally even saltwater may be used as a water source. Residues may be removed by occasional cleanup. The updraft of air results from heating due to the natural irradiation by the sun which simultaneously causes evaporation of water. When such a humidity laden airstream is turned around at its apex and cooled down while descending at the northwardly directed house side, it condenses and forms dew. This effect may be increased by a countercurrent comprising fresh air. The resulting water is collected and fed into the central water supply of a dwelling or the rain mechanism in the case of a greenhouse.

It is self-evident that various parameters must differ according to needs, whether the main task is the production of freshwater with a sufficiently high presence of heat (as in hot zones), whether additional energy is needed as required in temperature zones or finally, whether instead of a greenhouse, an air-conditioned climate-controlled dwelling has to run with the aid of the process according to the invention. It is important in the case of such an air-conditioned house that on the one hand, oversupply of heat be processed, i.e., that the internal rooms be sufficiently cooled down, and that on the other hand, as independent a supply of water as possible be procured by using brackish water, wastewater or, if need be, saltwater too.

Additionally, the invention is involved in creation of a climate-controlled building or rain-greenhouse according to the invention, where an optimum solution is found to the corresponding problems. The substantially southwardly-facing outer oblique panel is provided with a heat absorbing plane along with segments which are transparent to light. Said heat absorbing plane is at least partially backed by a plate provided with water-conducting capillaries, particularly a "suction fleece" (outer fleece). The inner oblique panel which is separated by a gangway is also covered in the area of the heat absorbing plane by a plate containing water-conducting capillaries, particularly a "suction fleece" (the inner fleece). The capillaries of both fleeces dip into a container and each of the panels at their upper ends connect either to an inner or to an outer back panel, said panels being arranged obliquely at a distance from each other and constructed of glass in the case of a greenhouse. The inner back panel contains devices for the collection of condensation water, such devices being connected to a water supply arrangement for the inner room, particularly a rain device. The space between the inner and outer panels serves as a stream channel for air.

An upwardly directed air-stream is formed in the stream channel between the outer and the inner southwardly-facing panels due to received heat radiation, which fills up with humidity from the water container. The main part of air humidity transported in this stream channel, results from the outer fleece which directly contacts the heat absorption plane belonging to the outer oblique panel. Thus the humidity (water) rising in the outer fleece due to capillary action is considerably heated so that considerable amounts of water vapor are conveyed to the air in the stream channel.

Part of the humidity which fills the air in the stream channel originates from the inner fleece. The delivery of humidity by the inner fleece, however, is not the primary effect. In this area, the primary effect is the cooling effect upon the inner oblique panel and thereby upon the inner space of the climate-controlled house or rain-greenhouse. Because the inner fleece with the liquid rising therein is not irradiated by the sun, (it is shaded by the heat absorption plane), the evaporative cooling activity here is due to the evaporation of liquid caused by the stream of liquid between the oblique panels.

The air-stream, laden to saturation with moisture, finally descends in the area of the gable into the stream channel formed at the north side of the building between outer and inner panels, where due to lack of sunshine lower temperatures prevail, so that water is increasingly condensed and falls upon the inner panel. This effect may be aided by adding a stream of fresh air which runs against the descending warm-humid airstream. The obliqueness of the inner back-panel allows collection of condensation water and its drainage, in given cases through a collecting container to a central water supply installation for a climate controlled house or to the rain-device for a rain-greenhouse, respectively.

The oblique panels and their connected panels are, in the realization of the invention, parts of two independent buildings, one standing inside the other building, provided with individual gable sides, said buildings being separated by a moat running between both buildings.

This particular embodiment of the climate-controlled house or rain-greenhouse with a circumferential moat which one can walk along has a decisive advantage compared to other arrangements that also function and which have double panel constructions. Continuous control is possible and occurring sediments may be easily removed. Particularly, when using brackish water or saltwater, it is imperative that the fleeces be cleaned or occasionally partially replaced. This activity can be achieved in practical application by making the space between the buildings easy to be walked on. Here, it is also possible to vary the geometry of the houses by, for instance, making the inner panels, particularly the southwardly-facing oblique panel, steeper than the outer panels. An upward tapering of the stream channel results from this construction and an acceleration of air-circulation thereby occurs. Depending on individual conditions (climate-regulated dwelling or rain-greenhouse) and external climatic conditions, it may be found more advantageous to construct such a differing inclination of the oblique panels or to choose a constant cross section of the airstream.

A climate controlled house will not be provided on its southwall with segments transparent to light in its oblique panels. Panels thereof which have not been provided with a heat absorbing coating for their function according to the invention will rather be furnished with solar cells for current supply of the dwelling. For rain-greenhouses in contrast, the southerly exposed oblique panels are preferably provided with glazing of the outer oblique panel together with a partial heat absorbing layer covering preferentially applied to its inner side, which comprises a black film of a good heat conductor, e.g., a metal.

The heat absorption plane of the outer oblique panel may be preferably broken up in strips which alternate with strips penetrable to light, in which case the width of the remaining strips transparent to light is a function of the external climatic conditions. In hot and tropical climatic zones where even narrow plane segments allow sufficient light for plant growth in the inside of a greenhouse, the larger heat absorbing plane will result in a larger production of water vapor and thereby satisfy a greater desire for the production of water.

Besides the aforementioned glazing of the outer oblique panel, it is also within the frame of the invention, particularly when used for climate controlled housing in the tropics, that the southern outer oblique wall comprise rock plates of dark complexion in certain cases like basalt, granite and slate. Furthermore, sheeted metal may be considered, such as aluminum-or copper-sheeting. Finally, dark coated glass plates may also serve as heat absorbing planes.

According to another characteristic of the invention, the aforementioned water-carrying inner panels, which were called "inner fleece" and "outer fleece" for simplicity, may comprise a scaffolding on which are fastened mats of organic or inorganic fibers or porous mineral material, like tufacious rocks or the like. It is of decisive importance to produce on one hand the needed capillarity in order to have a fleece plane in contact with the heat absorption plane, where a production of water vapor may take place so that, favored by the upwardly directed warm air-stream, a water conduit may be produced which is upwardly directed and is based upon capillarity. In the case of the inner fleece, it is of decisive value that water may rise sufficiently high in the capillaries in order to reach a correspondingly large surface which, due to evaporation cooling, serves to regulate the temperature in an inside room, i.e., to cool it down. There are, of course, varying requirements with respect to these working factors relating to the climatic zones. For instance, the need for cooling an inner room is considerably less in temperate zones than in the tropics. Therefore, the inner fleece must not extend too much upwardly in a climate-regulated house or a greenhouse. Practical life has shown though, that heat irradiation and water production of the outer fleece together with the air convection between the oblique panels lead to an equilibrium, which is obtained by increasing air current caused by increased solar irradiation and thereby increased evaporation at the inner fleece. Therefore, even at extreme external conditions, the inside temperature of a greenhouse never rises above about 20° C., considering that a certain amount of solar irradiation must always be allowed in a greenhouse for plant growth.

Furthermore, it was found advantageous that the southwardly-directed oblique panel show an inclination of 45° to the horizontal in temperate zones. That guarantees a particularly advantageous absorption of heat contained in the radiation of the sun. It is within the frame of the invention that the rear panel show an inclination to the horizontal of less than 45°, thereby extending the basic plane of the greenhouse and also improving its capacity to collect condensation water. Of course, the lower part of the rear panel may be, for example, vertical in order to create a walkway in the rim zone. Also, the repeatedly mentioned principle is valid in relation to the inclination of the oblique walls, and these parameters may be optimized according to the external climatic conditions. In other words, the most advantageous inclination of the South- or North oblique panels is determined differently, in the tropics and in temperate zones. Optimum conditions at each location may be found easily by observing the principles of function according to the invention.

The construction of the water container as a circumferential moat with a walkway, which is so extremely important and serves for easy clean-up according to the invention, additionally has an extremely equalizing influence in relation to the working of the device by day and by night. The moat serves as a heat reservoir so that (as experience has shown) in rain-greenhouses according to the invention, air convection and production of freshwater continues for many hours after sundown. Conversely, a strongly damping effect occurs, of course, when working in hot climates where extremely high day temperatures are contrasted with very low night temperatures. Inside of a climate-controlled building or rain-greenhouse, these large variations of outside temperatures are hardly noticeable. It was found that a rain-greenhouse according to the invention may be run even when the outside temperature falls below 0° C. Additional heating must only be provided when the outside temperature falls below −5° to −8° C. At these temperatures, it is sufficient to install the additional heating equipment in the moat, so that the water will not be too cold and the process of air circulation, evaporation and cooling may also function at low outside temperatures and relatively sparse insolation.

A very great advantage of the invention is that the system works completely independent of hoses, pumps and other components, independently whether the system is directed for working with greenhouses or with climate-controlled buildings in hot climate zones. This is of great importance for efficient, cheap and service-free functioning.

Furthermore, the invention provides, in the area of the bottom of the rear panels, inlet apertures for fresh air into the stream channel between the inner and outer rear panels as well as into the inner room of the greenhouse. This assures that even in hot climates, relatively cool fresh air will be provided, compared to the humidity-laden airstream at the southerly panels.

In an additional embodiment of the invention, cross-ventilating shafts may be provided in order to allow direct egress of warm air from the inner house. Said shafts cross the individual gable sides, distanced from each other, and connect directly to the outer atmosphere. For a large greenhouse or a dwelling, this cross ventilating aperture may simultaneously form a man-sized interlock which also forms an additional bulkhead between the southern side and the northern side of the building. This construction ensures that the convection current, so important for functioning according to the invention, may become fully active and that no short circuit arises because of a "by-pass" between the panel interspace at the side of the gables.

In case stronger cooling of the fresh air streaming in at the north side is desired or needed, an additional embodiment of the invention provides for a cooling system preferably formed as an absorber system without moving parts, e.g., an ammonia circulatory device.

For collection of condensation water, either collection containers may be provided at the lower end of the rear panel, or collection grooves may be provided which run across and, in the case of greenhouses, are directly connected to the rain device. In the simplest case it may comprise holes in the inner rear panel in the area of the collecting grooves.

Almost all problems have been solved satisfactorily by using one building within another one. A critical heat build-up between the oblique planes is prevented and particularly, "bleeding" of heat from the heat absorption plane onto the inner panel of the southern side is prevented. Further, cleaning and exchanging of the suction fleeces (inner fleece and outer fleece) is possible without any difficulties, the removal of sediment (industrial water with large chunks) is easily practicable, and algae may be combated easily. Despite all these advantages, it is possible that extremely dirty industrial water could prevent suction in the capillaries from obtaining the height needed for trouble-free working of the device. An additional embodiment of the invention provides that the water is at least partially conducted to the top.

For the sake of completeness, it should be added here that in greenhouses according to the invention, the bulkheading of the lower segment of the southern panels by the heat absorbing plane or the suction fleeces respectively, does not prevent full use of space. The area lying behind these bulkheaded segments may be used to grow plants which need less light (nightshades) or a gangway may be arranged immediately at the inner southerly-facing oblique panel.

Additional advantages, characteristics and details of the invention will result from the following description as well as the drawings.

Figure 1:
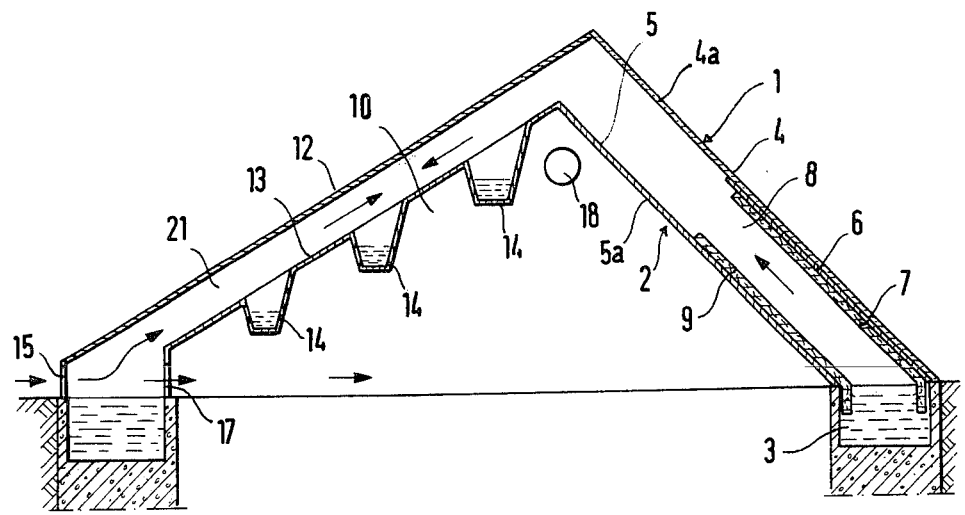
FIG. 1 is a cross section through an arrangement of a greenhouse according to the invention.

The greenhouse as shown in FIG. 1 has an irregular gable-shaped cross section. It comprises two houses, one arranged inside the other, which are separated by a moat 3. The outer oblique panel 4 and the inner oblique panel 5 face southerly, thereby exposed to maximum insolation. The angle with the horizontal plane is about 45°. The outer oblique panel 4, constructed of glass in the illustrated embodiment, is backed by a heat absorbing plane 6 at the inner side of its bottom, a metal plate for instance, under which a suction-fleece, the outer fleece 7, is disposed.

The outer fleece 7 and the heat absorbing plane 6 are mounted in such a way that good conduction of heat is guaranteed. The lower end of outer fleece 7 dips into moat 3 so that water located therein, possibly wastewater, brackish water or even saltwater, rises within the outer fleece, accepts heat from the highly heated heat-absorbing plane 2, and evaporates copiously. The water vapor joins air which was heated within the channel between the outer oblique plane 4 and the inner oblique panel 5 and streams upwards in the direction of the arrow as illustrated. The mixture of water vapor and air proceeds to the apex of the houses, one inside the other. During this airstream, additional evaporation of water occurs on a second plate, the inner fleece 9, said inner fleece 9 being arranged immediately upon the inner oblique panel 5, provided with capillaries and also dipping into moat 3. This evaporation causes the inner panel 5 to cool down with a corresponding regulation of the climate in the inner space 10 of the greenhouse. The upper sections of the outer oblique panel 4 or the inner oblique panel 5 respectively, are not covered by the heat absorbing plane 6 or the inner fleece 9. Both upper sections comprise glass to allow for the acceptance of sunshine, in order to furnish needed insolation for plant growth in the inner space 10 of the greenhouse. There is, of course, no need for the heat absorbing plane and the fleeces to cover the lower segments of panels 4 and 5. They could just as well form longitudinal strips, running downwardly from the top and which are separated by interstices, so that light may reach the greenhouse through both panels 4 and 5.

The size of the plane covered by the heat absorbing film, as well as the size of fleeces 7 and 9, are generally a function of the external climatic conditions. In temperate latitudes, the heat absorbing layer is not extended too high in order to provide sufficient light irradiation for the plants. Furthermore, the incident light is, of course, very important for the heating of the inner space of the greenhouse. In hot zones, the outer wall will be covered to a larger extent with a heat absorbing layer and correspondingly larger suction fleeces will be provided in order to reduce incident heat and light irradiation in the greenhouse. On the other hand, the correspondingly enlarged planes of the inner as well as the outer fleeces will produce more water and produce enlarged evaporation cooling, thus improving cooling of the greenhouse. These correlations will be described in detail below.

Within the area of the gable, the southwardly-directed oblique panels 4 and 5 of the two houses 1 and 2 respectively, each connect to a northwardly-facing oblique rear panel 12 and 13 respectively, whose angle of inclination is about 30°. The bottom segments of both rear panels 12 and 13 are almost vertical, so that the rim areas in the northern end of the greenhouse may still be worked. The rear panels 12 and 13 may be glazed, but do not have to be glazed, because the uncovered zones in the southwardly-facing panels 4 and 5 usually let in enough sunlight for plant growth. In the embodiment shown in FIG. 1, grooves 14 are disposed in the inner rear panel 13, said grooves 14 serving to collect condensation water which originates when the humidity-laden air, rising between the oblique panels 4 and 5 is cooled by external air streaming against it through the ventilating apertures 15. This cooling effect is possible because the stream of humidity-laden air is redirected in the area of the gable so that it streams downwards between the rear panels 12 and 13. Condensation water collecting in the grooves 14 may be brought to the plants either through bottom apertures of the grooves or by connected rain gutters 16 with egress borings (see FIG. 2), said rain gutters covering the width of planting in the greenhouses. The distance between panels 4 and 5, as well as between panels 12 and 13, and also the distance between the gable panels of houses 1 and 2 (not shown in the drawings) are so large that a gangway may be included, making it possible to control the suction fleeces, to clean or exchange them, to remove sediments occurring therein, or also to efficiently combat the inevitable formation of algae. The circumferential moat 3 between the houses 1 and 2 (one atop the other), must, of course, not fill the complete interstice. An additional base strip may be provided in order to allow a dry walkway within.

It is within the frame of the invention to improve the cooling down of the upwardly-directed humid, warm airstream between the two southerly panels. In other words, for the improvement of cooling down on the north side which favors condensation, an absorber system may be installed in the interspace between the panels. The evaporation side of this absorber system is disposed on the southerly side of the greenhouse, in certain cases at a distance away from it, and the refrigerating grid is disposed between panels 12 and 13 of the northside. A part of the fresh air arriving at the northerly side through the aeration apertures (vents) 15 reaches the inner rear panel 13 in the inner room 10 of the greenhouse directly through ventilation apertures (vents) 17. Furthermore, it is preferable that cross-ventilation channels 18 are provided which traverse each of the gable walls adjacent to each other in houses 1 and 2, so that warmed air from the inside of the greenhouse may be transferred immediately t the outside air. The channels 18 are preferentially disposed immediately below the gable, where warm air collects.

The relatively large distance between the southwardly-facing oblique panels 4 and 5, resulting from the interposition of a moat between the two houses 1 and 2 (one within the other), has the additional effect that no heat build-up occurs between these two panels as would happen if this construction would comprise a double wall with a few centimeters' distance. Furthermore, this method of construction prevents the heat arising from the heat absorbing plane 6 from immediately bleeding through towards inner panel 2, i.e., prevented from causing any additional heating of the greenhouse. The hotter it is, the more the heat absorbing film 6 heats up and the more the water evaporates in the outer fleece 7. Conversely, this causes a greater heating of air in channel 8, producing a larger air-stream, which now leads to greater evaporation of water on inner fleece 9, causing a greater respective evaporation cooling, which cools the inner wall 5 and thereby the inner space 10 of the greenhouse. In this manner, an equilibrium is worked out leading to a situation where the temperature in the greenhouse never rises above 30° C. even at strongest insolation and high outdoor temperatures. The areas at the inside of the greenhouse which lie in the shade of the heat absorbing plane 6 or the suction fleeces 7 and 9 respectively, can be stocked with nightshades, needing sparse illumination so that the area of the greenhouse is still exploited to an optimum degree.

Sunheat and sunshine are at the time of greatest heat, deflected to the moat by fleeces 7 and 9. Water in the moat 3 warms up, thereby increasing evaporation at the inner fleece 9 and also cooling the inner space 10 of the greenhouse due to the evaporation cooling effect. This process also results in effective regulation which prevents temperatures inside of the greenhouse from rising too high. Conversely, warm-up of the water in the circumferential moat 3 leads to an effective equilization between day and night. On the one hand, the production of water vapor and the raining of the inner space keeps on for several hours after sundown. On the other hand, the large reservoir of water in moat 3 represents a good heat buffer. The functioning of the rain-greenhouse according to the invention is capable of performing even at temperatures below 0° C. without any heating. It is only advisable at temperatures below −5° C. to arrange for heating of the water in moat 3. Thus, it is possible to run greenhouses according to the invention like cold frames (for vegetables) all winter long in our northern latitudes without expending any energy. Hot houses will even need considerably lower additional energy, compared to those run by extant systems, which will have to be ready for use only in times of great frost, as previously mentioned. A rain-greenhouse according to the invention functions completely automatically, even with automatic rainfall, needs no hoses for distribution or pumping devices, and may comprise a variety of materials. The panels do not have to be glazed, as they may comprise metal or stone. Furthermore, a greenhouse according to the invention may be built with very simple means (e.g., "do-it-yourself" means) and it offers (due to its regulation mechanism, and based upon its functioning) a moderate climate which greatly balances external fluctuations of temperature.

Figure 2:
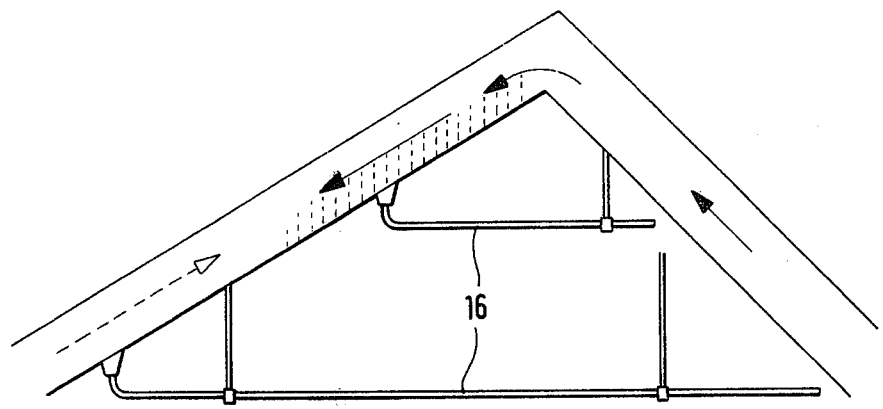
FIG. 2 is a partial cross section through a variation of an embodiment of the greenhouse.
Figure 3:
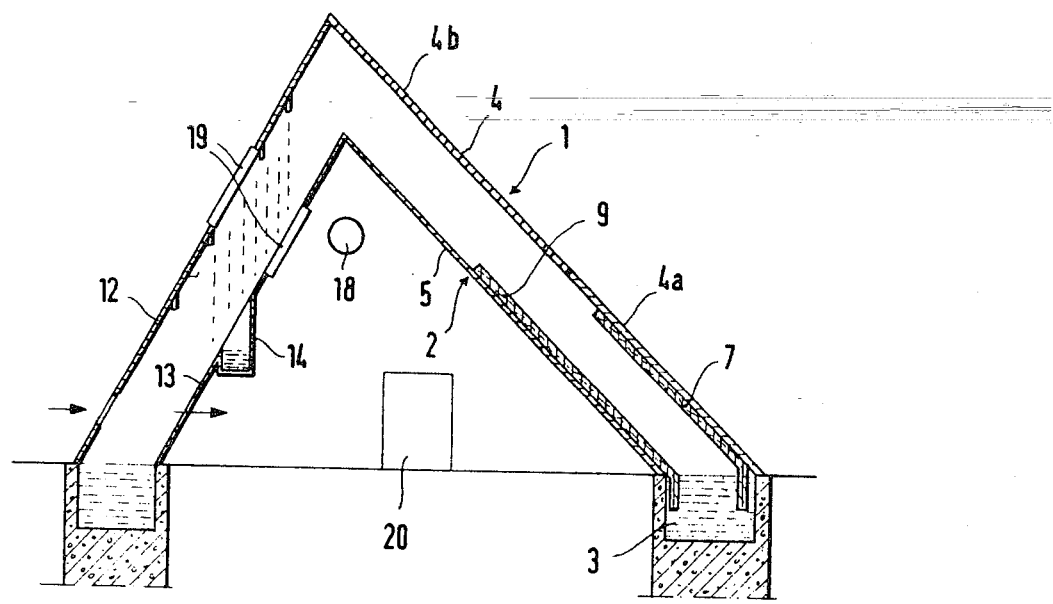
FIG. 3 is a section of a climate-controlled dwelling according to the invention.

The principle of the rain-greenhouse, shown in FIGS. 1 and 2, is easily translated to the plans for building a dwelling in hot climatic zones, as shown schematically in FIG. 3. In that case, the inclination of panels 4 and 5 or 12 and 13 respectively, of the houses built on top of each other, is opposite to the inclination of these panels in moderate latitudes. In other words, the southern panels have a flatter inclination that the northern panels. Here, the southern panels are preferably windowless, where the lower segments 4a are provided with heat absorbing planes or form, by themselves, such planes by being made out of stone plates that are adaptable for such a use. In very hot zones, the heat absorbing plane, particularly for greenhouses, may instead comprise a dark film of a bright material, for instance by the suction fleece itself, so that superfluous heat can be reflected. The unused upper segments 4b may be furnished with solar cells in order to produce electrical energy for running the house. The condensation water, collected in channel 14, serves as a water supply for the house, said water derived from the wastewater or saltwater disposed in moat 3 (such impure waters are almost always present even in the most waterless climatic zones).

Windows are denoted by 19 and are shown schematically upon the north side of FIG. 3. Functioning is practically the same as in the aforedescribed rain-greenhouse according to FIGS. 1 and 2. The heat of the sun irradiating the south panel produces water vapor out of the brackish water in the circumferential moat 3 which, on the one hand, assures water supply for the house. On the other hand, evaporation at the inner fleece 9 assures effective cooling of the inside of the house. Finally, an entrance lock 20 is provided between outer house 1 and inner house 2.

Figure 4:
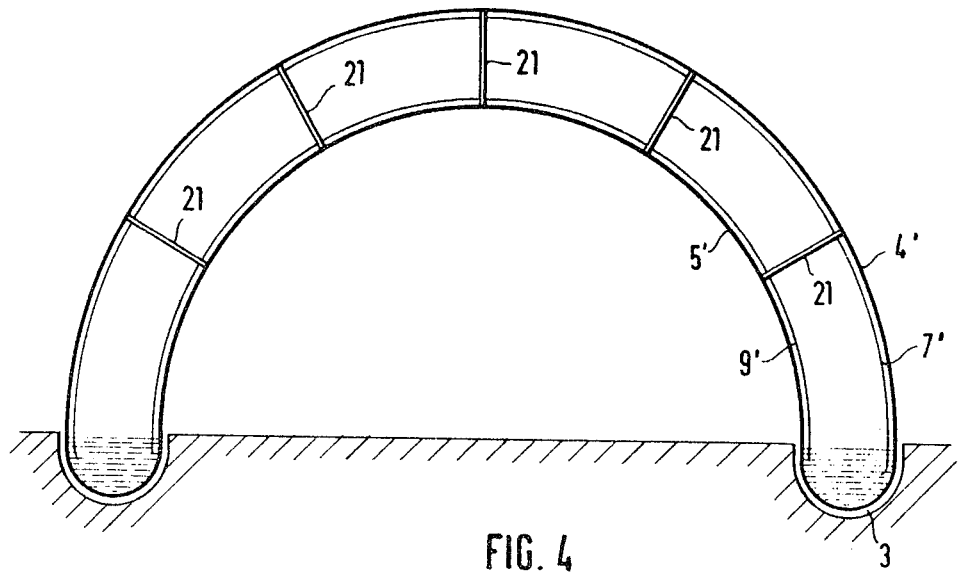
FIG. 4 is an air-inflated shed according to the invention.

FIG. 4 is a cross section of an air-inflated shed as a variation of the climate controlled building or rain-greenhouse. The outer panel 4' and the inner panel 5' are comprised here of a transparent plastic film which is welded to form one piece. Between the panels 4' and 5', distance rods 21 are disposed, which may be hollow, containing valves for pressure compensation, and may also serve for cross ventilation. The foundation must provide a moat 3. Water is brought immediately into the welded film construction and anchors it thereby, so that the film must not connect rigidly to the soil. The aforedescribed suction fleeces 7' and 9' hang into water in moat 3. According to an additional characteristic of the invention, no overpressure is provided inside of the shed against the outside, but overpressure is exerted between the outer panel 4' and the inner panel 5'. That has the advantages that no pressure locks are needed at the entrances and that sustenance of rigidity of the shed is considerably simplified.

The air inflation method according to the invention may be used as well for greenhouses and also for climate-controlled large storage spaces, sport halls and particularly, tennis halls.

Figure 5:
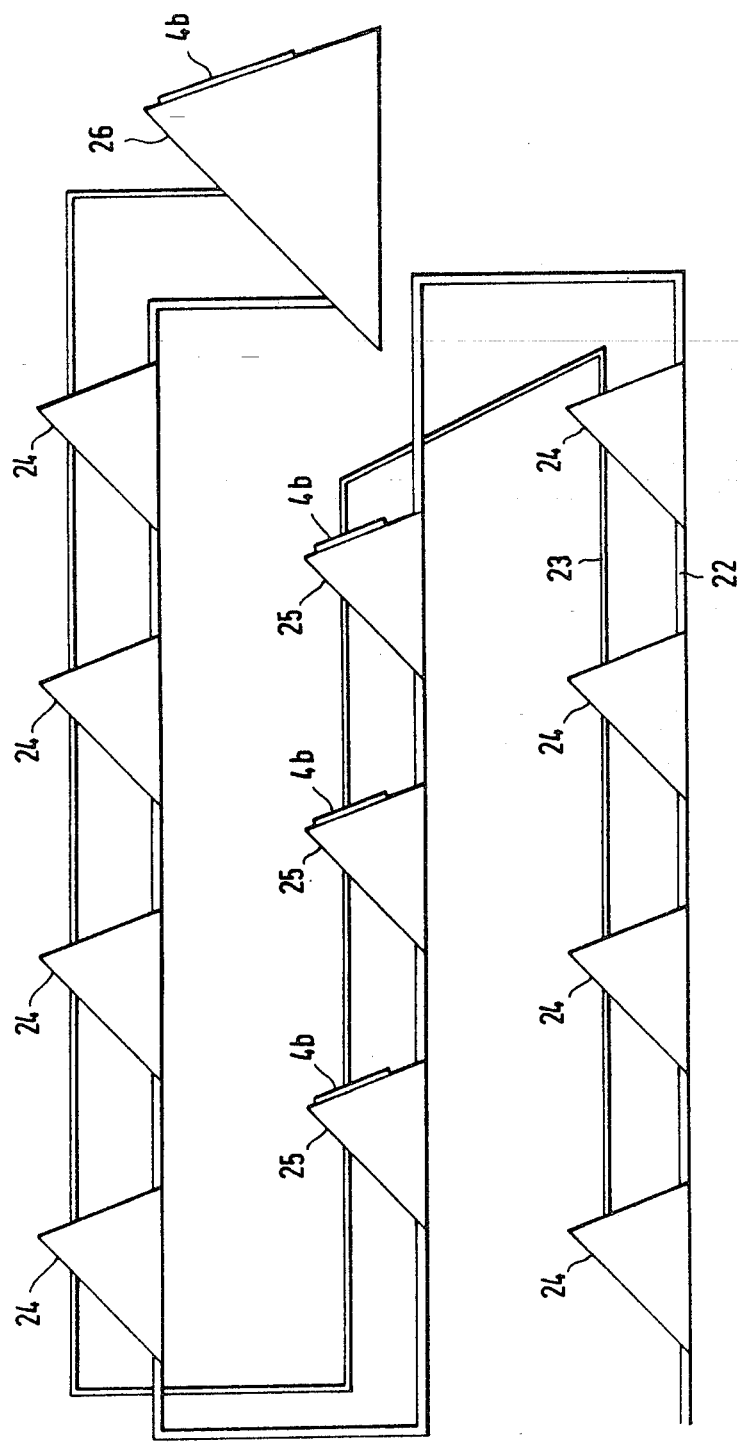
FIGS. 5-7 are all various combinations of greenhouses and climate-controlled houses according to the invention.

FIG. 5 shows a combination design for a projected cooperative for developing countries with dwellings, greenhouses and public buildings. 22 is a circular supply conduit for salt- or brackish water and 23 is a fresh water conduit. These conduits connect the greenhouses 24 to the dwellings 25 and the community house 26, the dwellings 25 and 26 being recognizable by the solar cells 4b atop.

Figure 6:
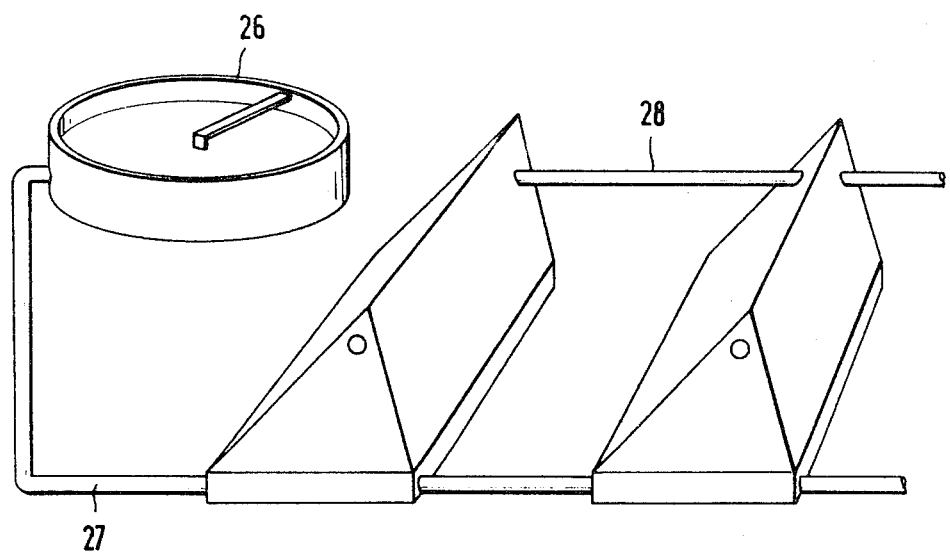
Figure 7:
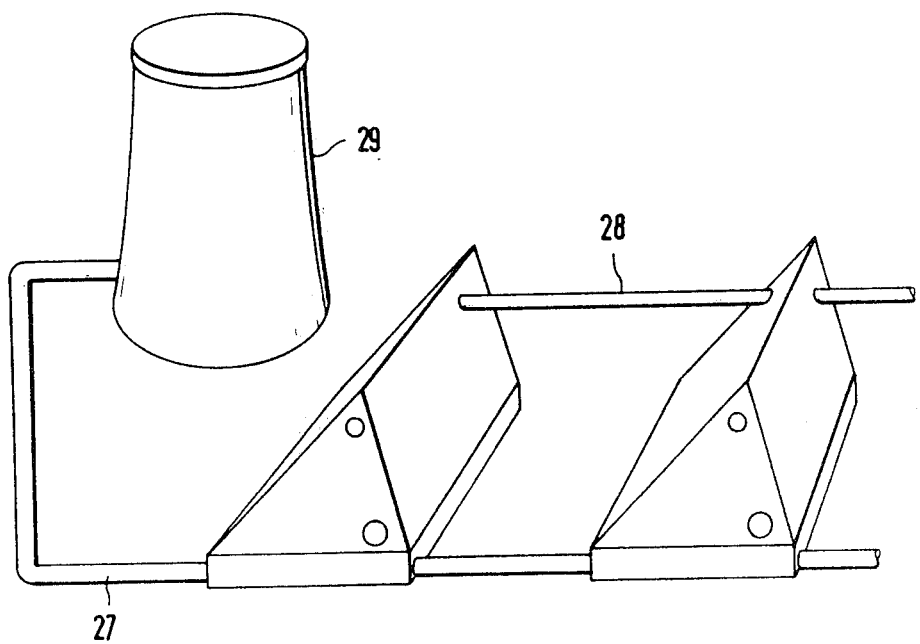

FIG. 6 shows the possibility of combining rain-greenhouses according to the invention with water clarification plants where said plants, shown in design by one single settling sump 26, deliver pre-cleaned surface water through pipeline 27 to the moats between the two houses, one atop the other. 28 is the common freshwater conduit of the greenhouses. Similar to the presence of a clarifying plant shown in FIG. 6, rain-greenhouses according to the invention may be combined very advantageously with cooling towers 29 of industrial plants or electric power stations shown in FIG. 7. The elevated temperature of the cooling water arriving through conduit 27 and filling the moats of the double-walled houses results in particularly high effectiveness of the climate-controlled buildings and rain-greenhouses, coupled with increased fresh water supply which may also be used outside of the construction. Another advantage is that the cooling water reaches the environment without a considerable increase of temperature, so that rivers are not heated, precluding any ecological difficulties.

The invention is not restricted to the cited embodiments. It is reasonable that a climate-controlled building or rain-greenhouse may be used in many other embodiments without deviating from the basic concepts of the invention. Furthermore, it may be used for open-air pools and other roofed structures.

It would also be possible to exhaust hot air from the inner building through one of the ventilation channels 18 by means of a van which gets the energy by solar cells. The hot air can be conducted through the water in the moat 3. The cooled air is then conducted to the second channel 18 and back into the inner building.

What is claimed is:

1. An apparatus for controlling the climate in a building comprises:
   (A) a plurality of oblique panels facing the path of the sun and arranged at a distance from each other, a heat absorbing plane provided along at least a portion of the outer oblique panel, at least one plate in the form of a suction fleece provided with water-guiding capillaries positioned near a portion of said outer oblique panel, at least one plate in the form of a suction fleece provided with water-guiding capillaries positioned near a portion of the inner oblique panel, a water container at the lower ends of said oblique panels so that said water-guiding capillaries dip into said water container,
   (B) a plurality of rearwardly-facing panels connected at an angle with the oblique panels facing the path of the sun to form a gabled arrangement, the inner rearwardly-facing oblique panel being provided with at least one device for collecting condensed water, and an inlet aperture for air provided near the bottom of the outer rearwardly-facing oblique panel,
   whereby the humidity in the air flowing upwardly between the two oblique panels facing the path of the sun is condensed from the air flowing downwardly between the rearwardly-facing oblique panels.

2. Apparatus for controlling the climate in a building comprising inclined inner and outer front walls defining two spaced front walls facing generally south to receive the sun, water supply means supplying water to the space between said inner and outer front walls such that the water is evaporated in said space by the heat of the sun and the humidity is thereby increased in said space, inclined inner and outer rear walls generally facing north and defining two spaced rearwardly facing walls connected to said inner and outer front walls respectively in a gabled arrangement such that the space between the inner and outer front walls is contiguous with the space between the inner and outer rear walls, a water reservoir means in communication with said space between said inner and outer front walls such that water in said water reservoir means provides a source of water for said water supply means, whereby the humidity-enhanced and heated air rises in said space between said front walls and then descends into said space between said rear walls, said descending air being cooled due to said rear walls facing north such that the moisture in said descending air is condensed in the space between said rear walls.

3. Apparatus according to claim 2 further comprising inlet means introducing outside air into said space between said rear walls, said outside air further cooling and promoting condensation of said air in the space between said rear walls.

4. Apparatus according to claim 2 wherein said water supply means comprises capillary means in said space between said front walls, said capillary means being partially submerged in said water reservoir means such that water passes from said water reservoir means to said space between said front walls by capillary action.

5. Apparatus according to claim 4 wherein said capillary means comprises a suction fleece on at least a portion of the inside of said outer front wall and a suction fleece on at least a portion of the inside of said inner front wall.

6. Apparatus according to claim 5 further comprising a heat absorbing panel on at least a portion of the inside of said outer front wall, said panel being disposed between said outer front wall and said suction fleece on said outer front wall.

7. Apparatus according to claim 6 wherein said suction fleece on said inner and outer front walls and said heat absorbing panel extend only along lower portions of the respective front walls.

8. Apparatus according to claim 6 wherein said heat absorbing panel is made of metal.

9. Apparatus according to claim 6 wherein said heat absorbing panel comprises a plurality of spaced heat absorbing members.

10. Apparatus according to claim 2 wherein said water reservoir means comprises a moat which extends around the periphery of the building, said moat opening up into said space between said front walls and said space between said rear walls.

11. Apparatus according to claim 2 further comprising water collecting means for collecting condensed water in said space between said rear walls.

12. Apparatus according to claim 11 wherein said water collecting means is disposed on said inner rear wall and comprises a plurality of collecting grooves running substantially across the path of air stream flowing in said space between said rear walls.

13. Apparatus according to claim 11 wherein said water collecting means comprises a plurality of containers disposed underneath said rear inner wall.

14. Apparatus according to claim 11 further comprising a distributing means within said building and receiving water from said water receiving means for distributing water within said building.

15. Apparatus according to claim 2 wherein said front walls comprise a glass construction.

16. Apparatus according to claim 2 wherein said rear walls comprise a glass construction.

17. Apparatus according to claim 2 further comprising side walls, and at least one cross ventilating opening traversing each of said side walls of the buildings to connect the inside of the building with the outside atmosphere.

* * * * *